Oct. 11, 1960  B. E. WILLIAMS  2,955,940
PRESERVATIVE TREATMENT OF VEGETABLE PRODUCE
Filed Oct. 11, 1957
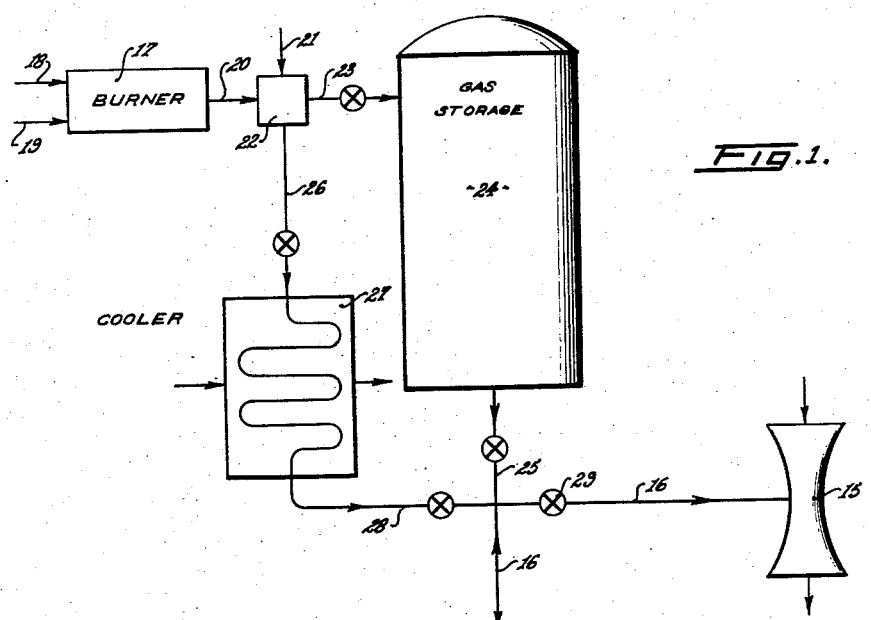
Fig. 1.
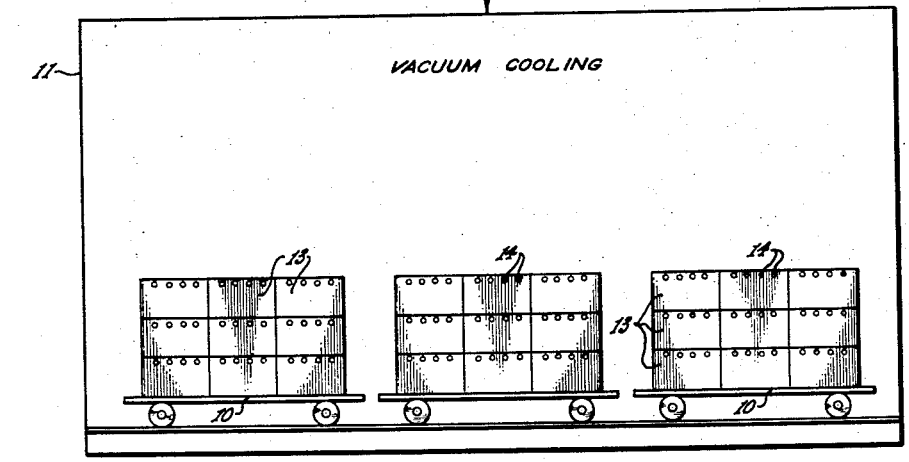
Fig. 2.
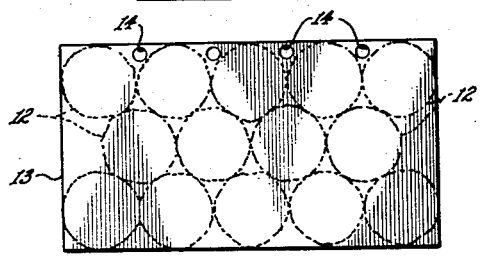
BEVERLY E. WILLIAMS
INVENTOR.
BY H. Calvin White
ATTORNEY

United States Patent Office 2,955,940
Patented Oct. 11, 1960

2,955,940

PRESERVATIVE TREATMENT OF VEGETABLE PRODUCE

Beverly E. Williams, Hillsborough, Calif., assignor to Hodges Research and Development Company, New York, N.Y., a corporation of California Filed Oct. 11, 1957, Ser. No. 689,583

5 Claims. (Cl. 99—154)

This invention has to do with the treatment or processing of vegetable produce with substantially oxygen-free gases for preservation of the produce during shipment and distribution, and is directed to improved methods whereby benefits of such treatment can be realized to better and longer advantage than has been possible by treatments of this type heretofore proposed. The invention is particularly concerned with the preservation of leafy vegetables such as lettuce, cabbage, broccoli and the like which present large surface areas, much of which are so confined within the leaf structures as to be difficultly accessible to preservative gases applied in the usual manners. Of major practical importance is the preservation of lettuce, in reference to which a typical adaptation of the invention will be described.

It has been found that oxygen-free gases, particularly combustion gases consisting essentially of carbon monoxide and nitrogen, may be used to advantage in maintaining many of the desirable qualities of lettuce over the extended periods of time consumed in its shipment and distribution. Some of the effects of the gas treatment are to sterilize and inhibit mold formation and bacterial decomposition, to prevent browning of the leaves, and to maintain the desirable crispness, freshness and color of the produce. Generally it has been proposed to so treat the produce by contacting or exposing it, at about atmospheric pressure, to combustion gas, which may contain minor or trace quantities of acetylene.

Such conventional proposals have been found to involve inherent limitations in the extent or degree to which air contacting all the surfaces of the produce, can be replaced with a non-oxidizing gas, and the temporary duration of the treatment because of uninhibited access of air thereafter to the treated surfaces. As indicated, entry of the treating gas to the innermost regions of the produce, is resisted by the air present, and such initially beneficial effects that may have been gained, tend to be soon lost because of further dilution by the atmospheric air.

The present invention has for one of its major objects to accomplish initially a more complete penetration, distribution, and concentration of the treating gas within each piece of the leafy produce, by preceding the gas treatment with evacuation of air from the produce to a degree that will permit gas entry to the innermost surfaces, and therefore establish a degree of surface contact and penetration favorable to prolonged retention of the gas. For purposes of evacuation, I prefer to subject the packed produce to deaeration by methods of the kind commonly employed for vacuum cooling of the produce, and involving generally the placement of the produce in a chamber which is rapidly evacuated to very low absolute pressure, usually below 10 mm. of mercury, in a period of time sufficiently short, say between 15 to 60 minutes, to cause not only evacuation but also cooling of the produce. Upon completion of the evacuation and resulting cooling, the invention contemplates replacement of the evacuated air by a substantially oxygen-free gas, preferably a combustion gas consisting essentially of carbon monoxide and nitrogen, which permeates the produce deeply and uniformly, and at a concentration increased by reason of the cooled condition of the produce.

Further objects of the invention are directed to retention of impregnating gas within each piece of produce, at concentrations which will extend its preservative effectiveness over longer periods of time during shipment and distribution of the produce. In accomplishment of this object, the produce during evacuation and gas impregnation, is kept within gas permeable enclosures about and contacting the pieces of produce. In addition to such functions as the produce enclosure may have purely for packaging purposes, the choice and function of the enclosure for the purposes of the invention, is to provide permeability that will allow initial exhaustion of air from the produce and its replacement by the treating gas, and further, that degree of enclosure which will resist replacement of the produce-contained gas by atmospheric air. It is within the contemplation of the invention to provide such enclosures either individually about the separate pieces of produce, or by gas permeable containers which individually will accommodate a number of pieces of the produce. As an example and preferred practice, the lettuce initially is packaged in paperboard or similar boxes or cartons provided with openings through which air is exhausted from the produce in the cooling treatment and is replaced by the treating gas upon introduction of the latter to the evacuated chamber. By reason of the limited openness or exposure of the produce through openings of the kind later typified, the gas permeating the pieces of produce tends to resist replacement by air and to remain over long periods at preservative concentrations.

The above mentioned as well as other additional features and objects of the invention together with the details of illustrative procedures for practicing the invention, will be more fully understood from the following detailed description of the accompanying drawing, in which:

Fig. 1 is a view illustrating diagrammatically and in flow sheet form the facilities employed for vacuum cooling and subsequent gas impregnation of the packaged produce; and Fig. 2 is a view illustrating a suitable type and form of package for the purpose.

Referring first to Fig. 1, in accordance with known procedures for the vacuum cooling of produce, the latter may be placed on suitable conveyors or trucks 10 within a chamber 11 equipped with suitable facilities for evacuating the chamber and its contained produce to low pressures, which as indicated, may be well below 10 mm. Hg absolute. The pieces of produce 12 are shown to be packaged for distribution in fiberboard boxes or cartons 13 which may be provided with relatively small apertures 14 through which air is exhausted from the cartons and contained produce as the evacuation proceeds. The steam ejector 15 communicating with the chamber 11 through line 16 may be regarded as typifying any suitable exhausting means for evacuating the chamber.

In the broad contemplation of the invention, the oxygen-free treating gas may be derived from any suitable source, although from considerations of practicability, it is preferred to use combustion gases resulting from the complete burning of a fuel such as a hydrocarbon within the methane to propane series fed to burner 17 through line 18 together with air supplied through line 19 at a ratio sufficient to oxidize the fuel substantially entirely to carbon monoxide and nitrogen with little or no free oxygen remaining in the outlet stream flowing through line 20. The fuel and the conditions of combustion may or may not be so selected and controlled as to leave trace quantities in the effluent of such hydrocarbons as acetylene and ethylene, or if the latter are desired otherwise, either or both may be added through line 21 for admixture with the combustion gas in chamber 22. The substantially oxygen-free gas so composed, may be discharged either through valved line 23 for storage in an accumulator 24 for delivery through lines 25 and 16 to the chamber 11, or the gas may be passed through valved line 26 through cooler 27 and thence through lines 28 and 25 to the accumulator 24 or through line 16 directly into the chamber 11.

As a typical procedure in practical operation, the packaged produce initially is cooled in chamber 11 by evacuation of the latter to a pressure of from 4-5 mm. of mercury absolute within a period of say from 30 to 50 minutes. Being somewhat moist when initially loaded into the chamber, the produce undergoes quick cooling by reason of vaporization of the moisture. When the evacuation and cooling are completed, valve 29 is closed and the essentially inert gas is introduced to replace the air evacuated from the produce and chamber, either from the accumulator 24 through line 25, or from the cooler discharge line 28, it being understood that in the latter event, the burner 17 is in operation during the period required for restoration of the pressure in the chamber 11 to substantially atmospheric pressure.

In replacing the air evacuated from the containers 13, the gas thoroughly and deeply penetrates the leafy surfaces of the produce pieces 12 and at a density that has been increased by reason of the cooled condition of the produce. Thereafter, following removal of the produce from the cooling chamber, the gas tends to remain in the produce and to resist replacement by atmospheric air, due to the completeness with which the gas has been caused to permeate the produce and the limited freedom with which atmospheric air can gain access through the carton apertures 14 for replacement of the gas. Thus, the overall effect of the treatment is to assure preservation of the desired qualities in the produce over the extended periods required for its shipping and distribution.

I claim:

1. The method of treating fresh leafy vegetable produce to improve its keeping qualities during shipment and distribution, that includes placing the produce in a chamber with gas permeable enclosures about and contacting the pieces of produce, evacuating the chamber to cool the produce and remove air from within the enclosures, and relieving the vacuum by introducing to said chamber a substantially oxygen-free innocuous gas consisting of on the order of 85% nitrogen, 12% carbon dioxide, and 2% carbon monoxide, said gas being produced by the combustion of propane and butane which is caused by virtue of the evacuation to permeate the produce and by virtue of the enclosures to resist oxygen access to the produce during subsequent shipment and distribution.

2. The method of treating fresh leafy vegetable produce to improve its keeping qualities during shipment and distribution, that includes placing the produce in a chamber with gas permeable enclosures about and contacting the pieces of produce, evacuating the chamber at an absolute pressure below 10 mm. absolute to cool the produce and remove air from within the enclosure, and relieving the vacuum at said pressure by introducing to said chamber a substantially oxygen-free innocuous gas consisting of on the order of 85% nitrogen, 12% carbon dioxide, and 2% carbon monoxide, said gas being produced by the combustion of propane and butane which is caused by virtue of the evacuation to permeate the produce and by virtue of the enclosures to resist oxygen access to the produce during subsequent shipment and distribution.

3. The method of treating fresh leafy vegetable produce to improve its keeping qualities during shipment and distribution, that includes placing the produce in a chamber with gas permeable enclosures about and contacting the pieces of produce, evacuating the chamber to cool the produce and remove air from within the enclosures, and relieving the vacuum by introducing to said chamber a substantially oxygen-free innocuous gas consisting essentially of carbon monoxide and nitrogen, said gas being produced by the combustion of propane and butane which is caused by virtue of the evacuation to permeate the produce and by virtue of the enclosures to resist oxygen access to the produce during subsequent shipment and distribution.

4. The method of treating fresh leafy vegetable produce to improve its keeping qualities during shipment and distribution, that includes placing the produce, packaged in gas permeable paperboard boxes, within a chamber, evacuating the chamber to cool the produce and remove air from within the enclosures, and relieving the vacuum by introducing to said chamber a substantially oxygen-free innocuous gas consisting essentially of carbon monoxide and nitrogen with about 2% carbon monoxide, said gas being produced by the combustion of propane and butane which is caused by virtue of the evacuation to permeate the produce and by virtue of the enclosures to resist oxygen access to the produce during subsequent shipment and distribution.

5. The method of treating fresh leafy vegetable produce to improve its keeping qualities during shipment and distribution, that includes placing the produce in a chamber with gas permeable enclosures about and contacting the pieces of produce, evacuating the chamber to cool the produce and remove air from within the enclosures, and relieving the vacuum in said chamber by introducing thereto a cooled substantially oxygen-free innocuous combustion gas consisting substantially of carbon monoxide and nitrogen containing approximately 12% carbon dioxide, said gas being produced by the combustion of propane and butane which is caused by virtue of the evacuation to permeate the produce and by virtue of the enclosures to resist oxygen access to the produce during subsequent shipment and distribution.

References Cited in the file of this patent

UNITED STATES PATENTS

| | | |
|---|---|---|
| 1,128,936 | Blagburn | Feb. 16, 1915 |
| 2,490,951 | Dunkley | Dec. 13, 1949 |
| 2,542,206 | Nichols | Feb. 20, 1951 |
| 2,606,704 | Nichols | Aug. 12, 1952 |
| 2,634,590 | Beardsley | Apr. 14, 1953 |
| 2,684,907 | Brunsing | July 27, 1954 |